(12) United States Patent
Reaves et al.

(10) Patent No.: US 6,487,286 B1
(45) Date of Patent: Nov. 26, 2002

(54) COMMON CHANNEL SIGNALING WITH A NETWORK OF DISTRIBUTED SIGNAL TRANSFER POINTS

(75) Inventors: James Edwin Reaves, Raleigh, NC (US); John H. Yoakum, Cary, NC (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/216,987

(22) Filed: Dec. 21, 1998

(51) Int. Cl.[7] ............................................... H04M 7/00
(52) U.S. Cl. ................... 379/221.1; 379/229; 379/230; 379/221.08
(58) Field of Search .................. 379/219, 229, 379/230, 221.08, 221.09, 221.1, 221.12

(56) References Cited

U.S. PATENT DOCUMENTS

| | | | |
|---|---|---|---|
| 4,979,118 A | * 12/1990 | Kheradpir | 701/117 |
| 4,998,240 A | 3/1991 | Williams | 370/17 |
| 5,276,529 A | 1/1994 | Williams | 358/406 |
| 5,291,489 A | 3/1994 | Morgan et al. | 370/85.1 |
| 5,375,159 A | 12/1994 | Williams | 379/23 |
| 5,457,729 A | 10/1995 | Hamann et al. | 379/2 |
| 5,481,673 A | 1/1996 | Michelson | 395/200.15 |
| 5,572,579 A | * 11/1996 | Orriss et al. | 379/142.01 |
| 5,692,039 A | * 11/1997 | Brankley et al. | 379/229 |
| 5,812,639 A | * 9/1998 | Bartholomew et al. | 370/352 |
| 5,861,614 A | * 1/1999 | Farris et al. | 379/221.09 |
| 5,878,127 A | * 3/1999 | Fleischer, III | 379/221.08 |
| 5,881,145 A | * 3/1999 | Giuhat et al. | 379/221.13 |
| 5,920,618 A | * 7/1999 | Fleischer, III et al. | 379/221.09 |
| 5,974,133 A | * 10/1999 | Fleischer, III et al. | 379/230 |
| 6,104,803 A | * 8/2000 | Weser et al. | 379/230 |
| 6,134,311 A | * 10/2000 | Ekstrom | 379/201.01 |
| 6,178,438 B1 | * 1/2001 | Tschirhart et al. | 709/200 |
| 6,249,577 B1 | * 6/2001 | Baldwin | 379/221.09 |

FOREIGN PATENT DOCUMENTS

EP 0 840 530 A 5/1998 ............ H04Q/3/00

OTHER PUBLICATIONS

European Search Report for corresponding European Application No. 99 31 0159, mailed Sep. 28, 2000.

* cited by examiner

Primary Examiner—Ahmad F. Matar
Assistant Examiner—Bing Bui
(74) Attorney, Agent, or Firm—Withrow & Terranova, P.L.L.C.

(57) ABSTRACT

The common channel signaling (CCS) system of the public switched telecommunication network involves digital call routing information that is communicated between the switches of the network and signal transfer points (STPs) of the CCS system and among the STPs themselves. The CCS system causes the network switches and the trunks that connect them to be so interconnected as to complete a connection between a calling party and a called party. The STPs are kept as close as practicable to the network switches so as to minimize the length of the digital transmission links between them. This results in a proliferation of less-than-optimally utilized STPs. Therefore, the constituent parts of a STP are geographically distributed over a wide geographical area with higher-capacity digital links between the constituent parts of the STP, in order to realize substantial transmission cost savings and to drastically reduce the number of individual STPs extant and thus reduce the complexity of the CCS communication between them.

18 Claims, 3 Drawing Sheets

COMMON CHANNEL SIGNALING WITH A NETWORK OF DISTRIBUTED SIGNAL TRANSFER POINTS

FIELD OF THE INVENTION

The present invention relates generally to the public switched telecommunication network and to the common channel signaling system that carries the messages that control the routing of toll and other telecommunication system connections. The call-routing messages are digital in nature and can be transmitted in any number of different digital transmission protocols. More particularly, the present invention relates to the organization of each signal transfer point of a common channel signaling system of the public switched telecommunication network and the addressing of each such geographically-distributed signal transfer point which serves a plurality of geographically-separated public switched telecommunication network switches.

BACKGROUND OF THE INVENTION

The object of public telecommunication switches—sometimes called central office switches, toll switches, or service switching points (SSPs)—and the common channel signaling system (CCS) that controls the call-serving interconnections between SSPs is to connect, establish, or set up a telecommunication connection, most easily referred to as a "voice path," through as many SSPs and trunks (that interconnect SSPs) as necessary. That voice path then extends from a telecommunication customer's calling telephone or other terminal equipment (calling party) to a called telephone or other terminal equipment (called party), which might be located across town or across the country from the calling party. To establish such a voice path, the SSPs must be instructed as to the identification of the called party and be instructed to interconnect the calling party and the called party through a series of interconnecting SSPs and trunks of the public telecommunication network.

Formerly, the inter-SSP signaling necessary to establish such a communication or voice path used a series of dial-like tones. Such a series of signaling tones to set up such a path was sent over the same communication or voice path or inter-SSP trunk channel that would later carry the actual communication for the terminal-to-terminal conversation or communication. These tones were often audible to the caller.

Using the same channel for setting up or establishing a call path and for the later conversation—sometimes called voice-path signaling—had at least two disadvantages. The time of the trunk and other facilities during call set-up could not be billed to the customer and was thus partly wasted. Also, having the voice path carry path-control tones that were audible to the customer sometimes led unscrupulous customers, often at pay phones, to cut in with their own tone generators and misuse the public telecommunications network.

In order to enable the telecommunication service providers better to control the operation and operating costs of their networks, the call set-up signals were removed from the voice path and sent along separate, digital signaling channels. A great many call set-up signals for a great many calls can be sent very quickly over the same, common digital communication channel. Therefore, the system of sending digital call-set-up signals over a common signaling path was called common-channel-signaling (CCS).

A lot of common channel signaling messages can be sent over one channel. However, a switching service point (SSP) can easily have so much toll traffic that it needs several CCS channels to both send and receive CCS traffic. Also, each CCS message must be routed properly and may require different routing from almost every other CCS message at any given SSP. Therefore, the CCS messaging system must employ a small digital switching network of its own, in parallel with and almost mirroring the switches and trunks of the public switched telecommunication network.

The common channel signaling (CCS) digital switching network—each switch being called a signal transfer point (STP)—usually has several digital interface circuits and a digital switch sometimes resident or collocated at a SSP switching office. The CCS digital interface circuits and digital switch (together constituting the STP) are usually administered at that office, along with the SSP. For redundancy, every SSP must be served by at least two STPs, at least one of which must not be collocated with the SSP. In addition, redundancy requirements dictate that each STP must be able to communicate with at least three other STPs.

Each CCS signal transfer point (STP) has its own digital address (called a point code or "PC") within the CCS network, much as a company, a factory, or an engineering department might have its own e-mail domain address on the internet Essentially, with most central or toll switching offices (SSPs) having their own point codes or PCs within the CCS network as well as a separate PC for each STP, addressing and routing of CCS messages can be a needlessly complex problem. This can result in a necessary but undesirable proliferation of STPs and their PCs. Essentially, with most central or toll switching offices (SSPs) having their own point codes or PCs within the CCS network as well as a separate PCs for each STP[s], addressing and routing of CCS messages can be a needlessly complex problem. This can result in a necessary but undesirable proliferation of STPs and their PCs.

Also, the digital CCS interconnections between SSPs and the STPs that serve them as well as the interconnections between STPs typically use a digital transmission protocol known SS7. The SS7 protocol, as with most digital transmission protocols, has a number of bytes reserved for the sending address, a number of bytes reserved for the receiving address and a portion for the data or message. With a proliferation of SSPs, STPs, and other portions of the telecommunication infrastructure, the portion of the SS7 protocol reserved for the sending and receiving addresses is expected, eventually, to become limiting.

The SS7 protocol messages are normally communicated between the SSPs and the STPS that serve them and also between the STPs themselves at a standard 56 or 64 kilobits per second (KB). However, with new high-speed links, the SS7 signals could be communicated at 1.544 megabits per second (MB). These interconnections are rather expensive for their normal transmission speed capability and are usually kept short. Also, when the amount of CCS traffic on an SS7 link gets too high, that SS7 link must be paralleled by a second SS7 link. Since each STP must be connected to three STPs and each of those three other STPs must be able to take the highest traffic volume from that STP, several of the SS7 links that interconnect those three STPs to each other and to still other STPs must also be paralleled, which multiple links are referred to as Linksets.

Whenever another switching office or switching service point (SSP) is added to the public switched telecommunications network or when other changes are made, such as changing direct distance dialing area code numbers, as has been happening with increasing frequency in recent years, the many STPs and the databases that they use must be updated to reflect the necessary expansion of the public switched telecommunications network. With the large numbers of STPs extant, in order to be safely separated from their SSPs and yet have short SS7 links, the capitol investment in the common channel signaling (CCS) system is rising fast.

SUMMARY OF THE INVENTION

Accordingly, the present invention is directed to maximizing the efficiency of the common channel signaling (CCS) system of the public switched telecommunication network by distributing the constituent parts of each CCS signal transfer point (STP) so as to allow a STP to serve a larger number of geographically-dispersed of SSPs with each served SSP having a resident or non-collocated but nearby portion of a distributed STP. The SS7 communication links between the SSP and the portion of a STP can then be kept very short. The resultant necessary communication between the geographically-distributed constituent parts of a STP is then accomplished at a much higher speed with any suitable digital transmission protocol. In this way, the capitol costs of the STP hardware are minimized and the length of 56 KB SS7 links are also shortened, thereby further reducing costs. Also, by minimizing the number of STPs contained in the CCS network the number of STP addresses necessary is also minimized.

It is also an object of the present invention more fully to utilize the capability of each CCS STP by causing each STP to be distributed over a large geographic area in order to serve a large number of widely disbursed SSPs without extending costly communication channels over long distances.

Additional objects and advantages of the present invention are set forth in part in the description which follows and in part will be apparent from the following detailed description or may be learned by practice of the invention. Objects and advantages of the invention will be realized from the elements and combinations particularly pointed out in the appended claims.

BRIEF DESCRIPTION OF THE DRAWINGS

A more complete understanding of the present invention will be had from the following detailed description when considered in connection with the accompanying drawings, wherein the same reference numbers refer to the same or corresponding items shown throughout the several figures, in which.

DETAILED DESCRIPTION AND PRACTICAL APPLICATION

Figure 1:
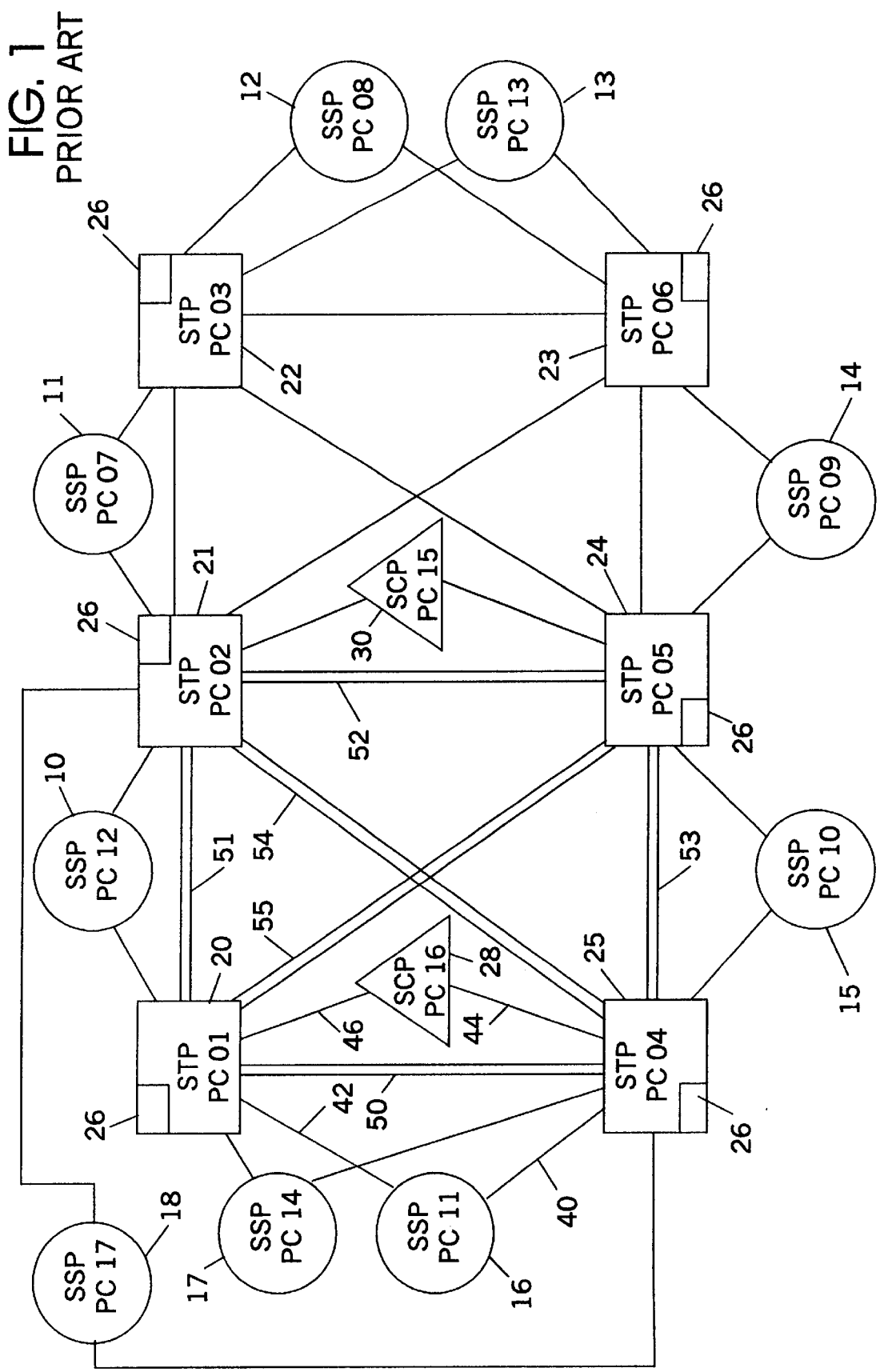
FIG. 1 is a schematic illustration of the typical interconnection of SSPs and STPs according to the prior art.

Referring now to the drawings and particularly to FIG. 1, there is shown a typical sampling of public switched telecommunication network switches—service switching points (SSPs) 10 through 18—which might be scattered over a metropolitan area or even over a wider geographical area. The several SSPs that serve an area may be local central office telecommunication or telephone switches or toll switches which serve principally to interconnect local SSPs that are farther away from each other. These SSPs are linked by telecommunication transmission trunks (not shown) which carry the actual telecommunication revenue traffic between SSPs. However, instructions commanding the SSPs to so interconnect a string of SSPs and trunks so as to connect a calling party to a called party are sent over separate communication channels that are part of a system called a common channel signaling (CCS) system or network.

According to the prior art, the CCS system comprises a plurality of signal transfer points (STPs) 20–25, which are linked to the SSPs that they serve and to each other, either directly or through indirect connections via other, intermediate STPs. All of the CCS traffic between the SSPs and their associated STPs and between the several STPs is digital transmission conventionally at 56 kilobits (KB) per second, using a transmission protocol known as SS7. The 56 KB transmission channels are more expensive per bit transmitted than are higher speed channels such as those which carry data at 1.5 megabits (MB) per second or higher. To the extent that newer types of optical fiber communication are used, speeds of 155 MB per second or more are possible.

Each STP 20–25 includes a transmission and control unit 26 which performs housekeeping tasks within the STP and controls communication between the STP and other STPs. The control unit 26 is also the interface through which a technician can configure and provide the STP with information relating to communicating with other STPs. Therefore, any change or administrative action that must be made in an STP's programming requires technician access to that STP's control unit 26.

For safety and redundancy, each service switching point (SSP) must be served by no less than two signal transfer points (STPs). While one of the STPs that service a SSP may be collocated with the SSP that it serves, it is preferred that SSPs and the STPs that serve them not be collocated. Therefore, for safety and redundancy, every SSP must be served by at least one STP that is not collocated with that SSP.

The STPs must be served by service control points (SCPs) 28 and 30. SCPs are database servers which provide call routing information to the STPs so that the STPs can perform their tasks of communicating call routing information to the SSPs. For safety and redundancy, there are at least two SCPs to serve a group of STPs. Also for safety and redundancy, each SCP is digitally connected to at least two STPs. The database queries to and responses from a SCP can be communicated directly between the SCP and any STP to which the SCP is connected or can be communicated indirectly through any number of intermediate STPs.

For safety and redundancy, each STP is typically in SS7 communication with at least three other STPs. This redundant interconnection typically results from the practice of interconnecting STPs in a "quad" arrangement, with each STP of a quad having SS7 connections to the other three STPs of the quad. For example, the STPs 21 and 24 of FIG. 1 are connected in a quad arrangement with the STPs 20 and 25. However, the STPs 21 and 24 are also connected in a quad arrangement with the STPs 22 and 26.

The common channel signaling (CCS) system includes all of the SS7 digital communication links that interconnect the service transfer points (STPs) with the service switching points (SSPs), with the service control points (SCPs), and with other STPs. For example, in FIG. 1, the SSP 16 is connected to the STP 25 by an SS7 link 40, whether or not the STP 25 is collocated with the SSP 16. For redundancy, the SSP 16 is also connected to the STP 20 by an SS7 link 42.

The STP 25 is also connected to the database server, SCP 28, by an SS7 link 44. For redundancy, the SCP 28 is also connected to the STP 20, by an SS7 link 46. The STP 24 can obtain its database services from either the SCP 30, to which the STP 24 is directly connected, or from the SCP 28 through either the STP 25 or the STP 20, to which the STP 24 is also connected.

The SS7 links, such as links 40, 42, 44, 46 and all of the officer such links on FIG. 1, have a nominal capacity of 56 KB per second. However, the standards for the common chapel signaling (CCS) system require that SS7 links should not be engineered or planned to reach their peak data communication rate. To fully load an SS7 link could cause unacceptable delay in completing call connection circuits. Therefore, as soon as an SS7 link begins reaching an arbitrary percentage (usually half) of its fill data transmission capability, it is supplemented. The requirement of limiting an SS7 link to half of its nominal capacity is also necessary since any SS7 link must be available to absorb the traffic of any nearby SS7 link tat might fail.

Six SS7 connections 50–55 are shown in FIG. 1 with double lines. The double lines indicate that two or more 56 KB SS7 channels actually constitute each of the SS7 connections 50–55. When more than one SS7 channel or link interconnects two points, those two or more links are collectively referred to as a "linkset."

As in the above-mentioned case of growing traffic requiring that a link be supplemented by another parallel link, to form a linkset, each link in a linkset is normally engineered to carry only about half of its nominal maximum capacity. Therefore, if one link of the linkset becomes inoperative, the other link can still carry the necessary digital common channel signaling (CCS) traffic between the two endpoints of the linkset.

While only the SS7 connection 51 of FIG. 1 might have begun to experience unacceptably high levels of digital CCS traffic between STPs 20 and 21, all of the other SS7 connections that could possibly serve these two STPs 20 and 21, as backup connections, must also be doubled. For example, if the two channels or links that constitute the SS7 linkset 51 were carried in the same cable which was suddenly damaged, the SS7 CCS traffic normally carried on the SS7 linkset 51 would have to be carried on the SS7 connections 54, 55, 52, 50, and 53, in addition to the normal traffic on those latter five SS7 linksets. Therefore, all six of the original links 50–55 would have to be doubled to form linksets 50–55, as shown in FIG. 1.

The traffic between a SSP and the STPs that serve it can often require linksets of five or more SS7 links.

Every service switching point (SSP) involved in completing a call connection path from a calling party to a called party must be commanded to perform some unique switching connection between an individual customer's telephone line or "drop" or must participate in connecting a series of trunks linking the end point SSPs of a call connection. Therefore, every SSP in the public switched telecommunication network has a unique digital address, called a "point code" or "PC," under the SS7 protocol. Conventionally, every service control point (SCP) and every signal transfer point (STP) also has a unique digital address or PC.

In compliance with the SS7 protocol, the point code digital address or PC of each SS7 data frame or packet must conform to and fit within the address space allocated by the SS7 protocol for the address of the receiving instrumentality. Referring to FIG. 1, each SSP, STP, and SCP has a unique PC which, for convenience, is merely referred to by a two-digit number in FIG. 1. However, each SS7 address constitutes a fixed number of bits, typically, either fourteen bits or twenty-four bits. However, with the proliferation of SSPs and STPs, the SS7 protocol is fast reaching the limit of the unique digital addresses permitted by the minimum size of the address portion of the SS7 data frame or packet.

Also, depending on the size of the SSP(s) that each STP serves, the necessary capacity of the STP may be near the physical and electronic capacity of the STP overall design. While a large part of each STP is modular and can be populated with as many or as few interface circuits (not separately shown in FIG. 1) as needed, there are several aspects of each STP (e.g., the transmission and control unit 26) that are not modular and must be provided to the STP whether it has few interface circuits or its maximum capacity of interface circuits. However, more normally, an STP will be populated with only a moderate to small number of interface circuits, compared to the capability of the transmission and control unit 26. Therefore, a large proportion of the non-modular part of each STP is usually underutilized.

Figure 2:
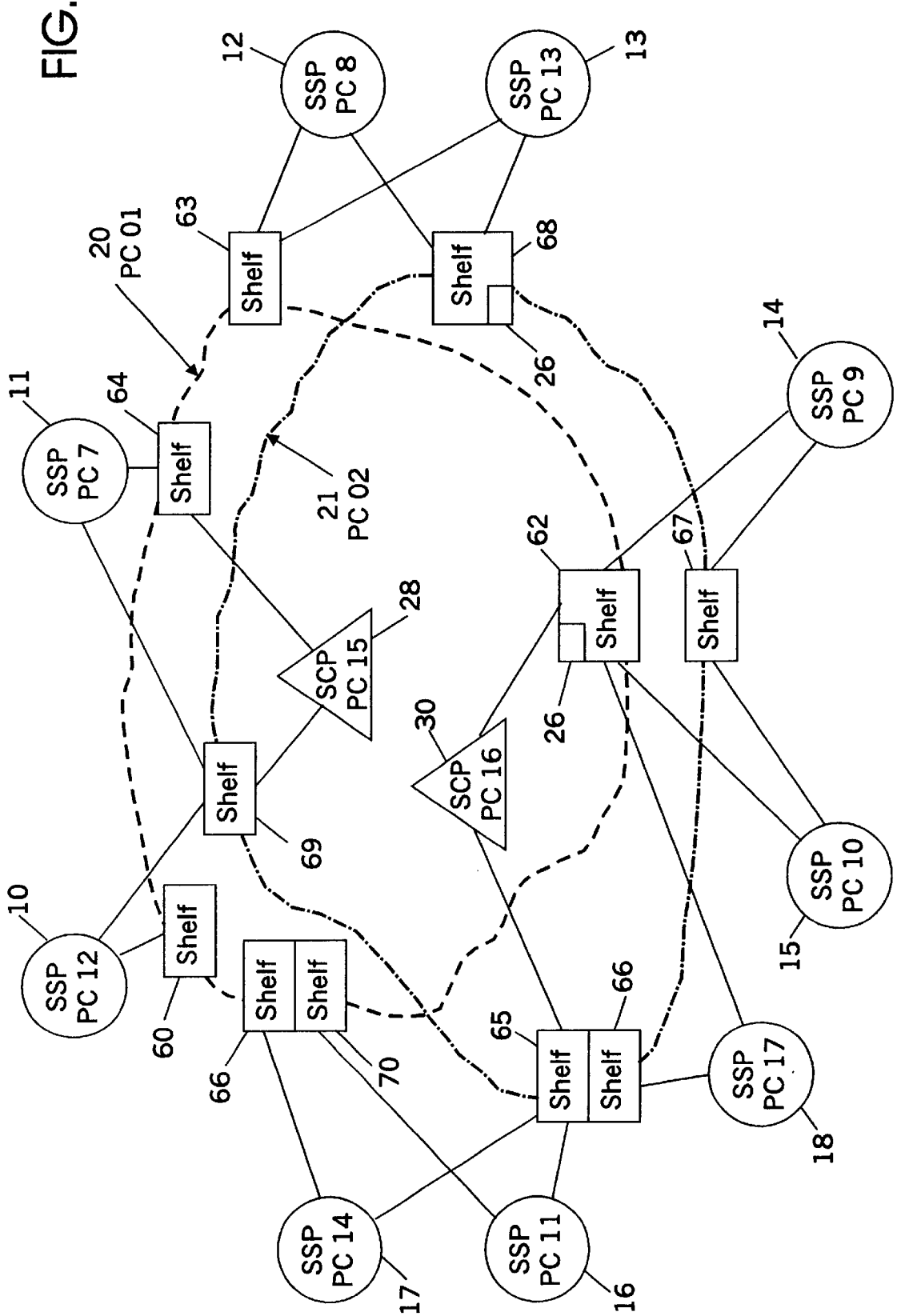
FIG. 2 is a schematic illustration of the preferred forms of interconnection of SSPs and STPs according to the present invention.

Referring now to FIG. 2, a reorganization of the common channel signaling (CCS) system according to the present invention is shown, with the number of signal transfer points (STPs) reduced from the six STPs shown in FIG. 1 to only two STPs 20 and 21, to serve the same service switching-points (SSPs) that were shown in FIG. 1. In FIG. 2, the rectangular blocks labeled shelves 60–70 are almost exclusively composed of modular portions of a STP, e.g., the interface and control units 26. The transmission and control unit 26 of each of the six STPs shown in FIG. 1 need only be present in one of the shelves (e.g., shelves 62 and 68) of each of the two STPs 20 and 21 that are depicted in FIG. 2.

Each STP of FIG. 2 is distributed among all of the SSPs shown in FIG. 2. Each SSP is still served by two STPs (the STPs 20 and 21). However, the non-modular portions of the STPs 22–25 have been largely eliminated. Also, only two digital addresses or point codes (PCs) are needed for the two STPs 20 and 21 that serve the same SSPs, thereby eliminating four PCs, compared with the CCS system of FIG. 1. In order to maintain the redundancy of using two STPs to serve each SSP, the STP 20 would not normally communicate with the STP 21. These two STPs both serve each SSP independently, with each STP having sufficient capacity to provide the entire CCS service to the SSPs should the other STP fail.

Communication between the shelves (e.g., shelves 60–64 and 70) of a single STP (e.g., STP 20 of FIG. 2) is preferably not at 56 KB using the SS7 protocol. The preferred mode of communication between the shelves of a STP is at a much higher digital transmission speed using the internet protocol (IP) or the asynchronous transfer mode (ATM) protocol. However, any reasonably suitable protocol would be quite usable.

The nature of the interconnection and communication within each of the two STPs depicted in FIG. 2 is suggested by the nature of the line connecting the shelves of that STP. That suggestion is of a loop-type communication, e.g., a token ring system. However, there is no need for the communication within a STP to be a ring. The IP, ATM, and any number of other protocols are just as usable with other forms of interconnection. For example, the internet is not a ring.

As depicted by the single line in FIG. 2 that connects all of the shelves of a single STP, the switched interconnection of the shelves is preferably by a switching network. The preferred shelf-to-shelf communication is dual-path asynchronous transfer mode (ATM) topology with redundancy connections. However, the shelf-to-shelf communication can be of any topology that permits fault-tolerant communications, such as dual path TCP/IP, frame relay, etc.

In a switching network, such as the switched network that links the shelves of STP 20 in FIG. 2, a plurality of digital switching devices or switches (not shown) are selectively connected to the several data terminals (the shelves)to be served, as well as to other switches, etc., within the network. In this way, the first switch receives a message from the transmitting terminal. The switches of the network switch the message among themselves until the message reaches a switch that is connected to the destination terminal. A switching network is a very flexible and fault-tolerant switching system and is widely used in other contexts.

In order to enhance redundancy and reliability of each STP, each shelf preferably has two inter-shelf communication ports to connect to two separate switching networks. Therefore, if a shelf's access to its network switch becomes disabled, the shelf is not disabled. Both of the switch networks are preferably dedicated to the single STP.

The nature of the communication within a STP is transparent to the SSPs that the STP serves. The SSP communicates with its associated STP shelves using the SS7 protocol and 56 KB transmission. How the shelves communicate to the rest of the world is immaterial to the SSP, so long as the CCS messages are sent, received, and executed fast enough to please the calling party with the speed at which his call is connected.

In FIG. 2, the SSPs are generally shown sharing shelves in pairs. That may be a practical, useful arrangement. The digital communication links between SSPs and the associated shelves that serve them should be kept as short as possible for the sake of low cost, commensurate with safety and redundancy. However, there is no requirement at all that such pairings should be the norm. In fact, SSP 18 has been shown in FIG. 2 for the sole purpose of illustrating that such pairings are unnecessary and that any number of SSPs and other system components, such as the SCP 30, for example, can be served by a single shelf (e.g., shelf or shelves 65 and 66). All that is required is that the shelf have adequate interfacing capacity for the service that it is asked to perform.

The service switching points (SSPs) 16 and 17 are shown sharing shelves 61, 30 65, 66, and 70. That is because, for illustration purposes, either or both of the SSPs 16 and/or 17 generate(s) a lot of CCS traffic. Therefore, a larger than usual number of interface circuits must be available to at least one of those two SSPs. Therefore, the use of two shelves 61 and 70 and two shelves 65 and 66 are shown in FIG. 2, but only to depict the quantitative amount of STP-type service that is provide to the SSPs 16 and/or 17. Consequently, for the same capacity, the shelves 61 and 70 could just as readily have been depicted as one shelf in FIG. 2. Similarly, the shelves 65 and 66 could just as easily have been depicted as one shelf.

The communication between the shelves that constitute each of the two signal transfer points (STPs) 20 and 21 has a very high capacity (1.5 MB, 155 MB, or more vs. standard 56 KB). Therefore, as the amount of CCS service required of the two STPs 20 and 21 increases, there is no need to add extra transmission capacity as was done between the STPs 20, 21, 24, and 25 of FIG. 1.

As more service switching points (SSPs) are added to the network depicted in FIG. 2 or if the SSPs of FIG. 2 are enlarged so as to serve more customers, the shelves 60–70 can simply grow in number or capacity in order to minimize the amount of hardware needed to provide CCS service and to minimize the SS7 transmission capacity and cost needed by keeping the shelves ever closer but not necessarily collocated with the SSPs. Until the non-modular portion of a STP, e.g., the transmission and control unit 26, approaches a desired maximum utilization, the shelves that are connected to the enlarging SSPs can simply enlarge to match. Similarly, the number of shelves can simply increase to match the increase in the number of nearby SSPs. Once maximum desired utilization of a STP's non-modular portion has been reached, only then is it necessary to reconfigure a STP into two or add a new STP.

The service control points (SCPS) 28 and 30 that provide database services for the STPs are also shown in FIG. 2. As in the prior art configuration illustrated in FIG. 1, for safety and redundancy, each STP is served by two or more SCPs. While two SCPs are shown for two STPs, it will be understood that each SCP can communicate with many other STPs in order to achieve the desired amount of utilization of each SCP. Also, one or more of the SCPs that serve the two STPs depicted in FIG. 2 need not communicate directly with one of the shelves of each STP. Each SCP can communicate indirectly with and serve as many STPs as desired using the same transmission facilities with which the STPs communicate CCS information with each other and with SSPs, that is, using the SS7 protocol and 56 KB. However, it will be evident that it may be economical or convenient to have SCPs communicate with STPs using the same protocol and speeds that are used for intra-STP communication. In fact, a SCP can be collocated with one of the shelves of a STP and thus communicate with all of the shelves of that STP using the same protocol and transmission speed as the intra-STP communication. An example of indirect communication between STPs, using the SS7 protocol at 56 KB, is illustrated in FIG. 1 between STP 23 and the SCP 30, through the STP 24 or through the STP 21 or the STP 22 and the STP 21.

The communication between the signal transfer points (STPs) 20 and 21 and the rest of the STPs of the common channel signaling (CCS) system would be conducted using the SS7 protocol, at least initially, during cutover from the configuration of FIG. 1 to the more economical configuration of FIG. 2. However, eventually, it may be more economical to employ another transmission protocol, e.g., IP or ATM, and 1.5 MB, 155 MB, or higher speed, rather than 56 KB, for the more heavily utilized CCS, inter-STP links.

It will be evident to a person having ordinary skill in the art that the STPs 20 and 21 of FIG. 2 can cover a very small or a very wide geographic area. For example, the STP network of shelves depicted in FIG. 2 might be distributed over a large number of locations covering a few square miles in lower Manhattan, in New York. Alternatively, they might be distributed over the entire state of Nevada, USA. It is theoretically possible to distribute a single STP around the perimeter of a nation.

However, wide geographic distribution, while philosophically interesting, invites needlessly high digital data transmission expenses. The CCS system is basically an overhead expense for a telecommunication service provider. Therefore, it is important to minimize the cost of operating a CCS system, within the limits of reliability and speed of response.

One way to keep costs down without compromising reliability or speed of response is to keep CCS communication links short. Therefore, shelves should be as near as possible to the SSPs that they serve, without having portions of both STPs that serve a SSP collocated with the SSP. Similarly, the intra-STP, inter-shelf communication should also be as short as possible, while still taking advantage of the hardware economies that can result from the exploitation of the configuration and method of operation of the present invention.

By comparing the illustrations of FIGS. 1 and 2, it can readily be seen that even the very simplified configuration depicted in FIG. 1 can be greatly simplified by the configuration of the present invention, depicted illustratively in FIG. 2. Instead of between three and eight STPs, each with a separate STP digital address or point code (PC), and with many dedicated inter-STP SS7 digital connections in order to achieve redundancy in the common channel signaling (CCS) system, the system illustrated in FIG. 2 has far fewer STPs, fewer dedicated digital connections, and a much improved general utilization of costly communication resources.

Figure 3:
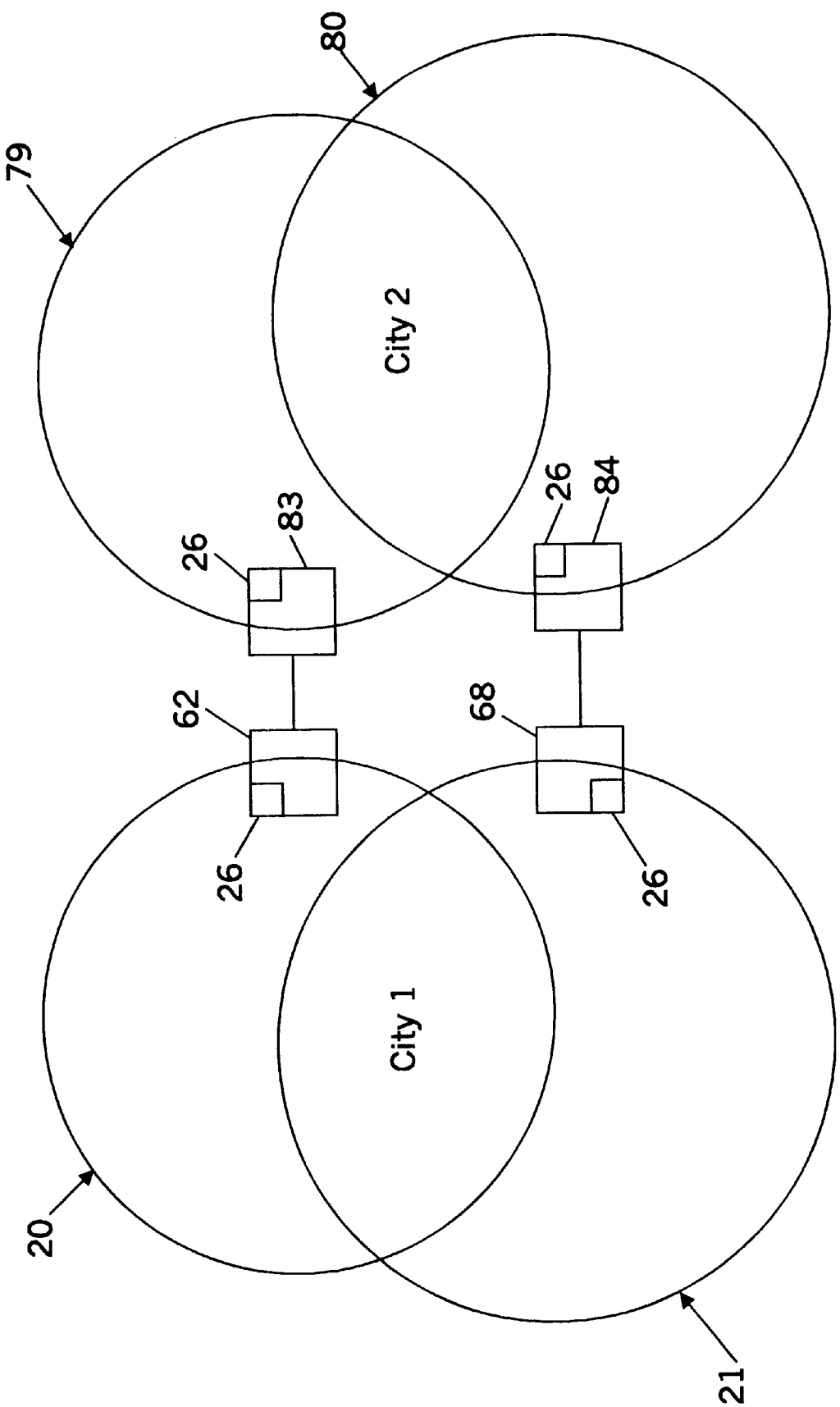
FIG. 3 is a schematic illustration of the interconnection of STPs serving separate geographic areas.

Referring now to FIG. 3, there is shown how the configuration of the present invention, as depicted in FIG. 2 could be utilized in a toll environment. The STPs 20 and 21 are shown as part of the CCS network of a first city (City 1); and two other STPs 79 and 80, similar in overall configuration to FIG. 2, are part of the CCS network of a second city (City 2).

Cities 1 and 2 could be twin cities such as Minneapolis and St. Paul, Minn., USA. The STPs 20 and 21 might serve the portion of City 1 that is nearest to City 2 and the STPs 79 and 80 might serve the portion of City 2 that is nearest to City 1. In that case, the shelf 62 of STP 20 might have a direct SS7 digital link to a shelf 83 of STP 79, and the shelf 68 of STP 21 might have a direct SS7 digital link to a shelf 84 of the STP 80.

The shelves 62, 68, 83, and 84 are the preferred input and output shelves of their respective STPs simply because those four shelves include the transmission and control units 26 of their respective STPs. However, it will be apparent to a person having ordinary skill in the art that any suitably-equipped shelf can be arranged to conduct transmission into and out of the STP. The trade-off is between hardware cost of the shelf vs. the length and thus the cost of the inter STP communication link.

It will also be apparent to a person having ordinary skill in the art that City 1 need not be adjacent to City 2. City 1 and City 2 could be across a large geographic area and even across a continent. In the case of a wide geographic distance between Cities 1 and 2, the digital link between shelf 62 and shelf 83, for example, would be very indirect. That link between shelf 62 and 83 could have an indeterminate number of intermediate STPs, depending upon the address portion of each digital data packet or frame of CCS SS7, ATM, or IP (for example) transmission to assure that intermediate STPs would speed the communication on its way, as in the case of digital packet or frame transmission on the internet.

While the specific structure and form of operation herein described constitute a preferred embodiment of the present invention, it is to be understood that the invention is not limited to this precise specific structure and form of operation, and that changes may be made therein without departing from the scope of the invention which is defined in the appended claims.

We claim:

1. A distributed signal transfer point for a common channel signaling system of the public switched telecommunication network, comprising:

a plurality of geographically-distributed network switches;

a plurality of constituent parts collectively forming a single signal transfer point, each such constituent part of the signal transfer point being associated with and located near but not necessarily collocated with a different one of said plurality of network switches, each constituent part of the signal transfer point further functioning as part of the single signal transfer point;

at least one digital transmission link between each constituent part of said signal transfer point and its associated network switch; and at least one digital transmission link connecting said constituent parts of said signal transfer point.

2. A distributed signal transfer point for a common channel signaling system of the public switched telecommunication network, comprising:

a plurality of geographically distributed network switches;

a plurality of constituent parts of a signal transfer point, each such constituent part of the signal transfer point being associated with and located near but not necessarily collocated with a different one of said plurality of network switches;

at least one digital transmission link between each constituent part of said signal transfer point and its associated network switch;

at least one digital transmission link connecting said constituent parts of said signal transfer point; and wherein said signal transfer point is identified by a single point code address irrespective of how many network switches that it serves.

3. A system of distributed signal transfer points according to claim 1 further comprising:

a plurality of constituent parts of another signal transfer point, at least one of such constituent parts being associated with and located near but not necessarily collocated with one of said plurality of network switches;

at least one digital transmission link between said at least one constituent part of said other signal transfer point and its associated network switch of said plurality of network switches; and at least one digital transmission link connecting said constituent parts of said other signal transfer point.

4. A system of distributed signal transfer points according to claim 1 further comprising a facility at one of said constituent parts for communication, administration and control of all of the constituent parts of the signal transfer point.

5. A system of distributed signal transfer points according to claim 1 further comprising a database facility associated with one of the constituent parts of a switching transfer point.

6. A public telecommunication switched network having a plurality of geographically-distributed service switching points, the interconnection of which is controlled by a common channel signaling system made up of a plurality of signal transfer points, each such signal transfer point comprising:

a plurality of geographically distributed shelves of interface circuits, each shelf of interface circuits being associated with and located proximal to a different service switching point, each shelf only functioning when said each shelf works together with other shelves as part of a single signal transfer point;

a first digital communication link between each service switching point and its associated proximal shelf of interface circuits;

at least one service control point for providing database service to at least said signal transfer point;

a digital communication link between said database server and at least one of said shelves of said signal transfer point; and at least one digital communication link between at least one shelf of said signal transfer point and at least one other signal transfer point of said common channel signaling system.

7. A public telecommunication switched network in accordance with claim 6, further comprising:

another database server for serving said signal transfer point; and a digital communication link between said other database server and at least one other of said shelves of said signal transfer point.

8. A public telecommunication switched network having a plurality of geographically-distributed service switching points, the interconnection of which is controlled by a common channel sparing system made up of a plurality of signal transfer points, each such signal transfer point comprising:

a plurality of geographically distributed shelves of interface circuits, each shelf of interface circuits being associated with and located proximal to a different service switching point;

a first digital communication link between each service switching point and its associated proximal shelf of interface circuits;

at least one service control point for providing database service to at least said signal transfer point;

a digital communication link between said database server and at least one of said shelves of said signal transfer point; and at least one digital communication link between at least one shelf of said signal transfer point and at least one other signal transfer point of said common channel signaling system wherein all shelves of a single signal transfer point share a common point code address irrespective of the number of service switching points that are served by shelves of said signal transfer point.

9. A public telecommunication switched network according to claim 6 further comprising a facility at one of said constituent parts for communication, administration and control of all of the constituent parts of the signal transfer point.

10. A public telecommunication switched network according to claim 6 wherein said signal transfer point is identified by a single point code address irrespective of how many network switches that it serves.

11. A public telecommunication switched network according to claim 6 further comprising a database facility located at one of the shelves of a switching transfer point.

12. A method of managing the common channel signaling system comprising a plurality of signal transfer points, for controlling the interconnection of the geographically distributed service switching points of a public switched telephone network, comprising:

locating only a portion of a signal transfer point proximal to but not necessarily collocated with but associated with a service switching point of the public switched telecommunications network, said portion only functioning when said portion works together with other portions as part of a single signal transfer point;

locating the other portions of the signal transfer point proximal to but not necessarily collocated with other geographically distributed service switching points of the public switched telecommunications network;

interconnecting said portion of the signal transfer point with said associated service switching point using a digital transmission link; and interconnecting said portion of the signal transfer point with said other portions of said signal transfer point using a digital transmission link.

13. A method of managing the common channel signaling system comprising a plurality of signal transfer points, for controlling the interconnection of the geographically distributed service switching points of a public switched telephone network, comprising:

locating only a portion of a signal transfer point proximal to but not necessarily collocated with but associated with a service switching point of the public switched telecommunications network;

locating the other portions of the signal transfer point proximal to but not necessarily collocated with other geographically distributed service switching points of the public switched telecommunications network;

interconnecting said portion of the signal transfer point with said associated service switching point using a digital transmission link;

interconnecting said portion of the signal transfer point with said other portions of said signal transfer point using a digital transmission link; and assigning a single point code address to all geographically-distributed portions to said signal transfer point.

14. A method of managing the common channel signaling system, in accordance with claim 12, further comprising operating said digital transmission link interconnecting said portion of the signal transfer point with said other portions of said signal transfer point at a higher transmission speed than said digital transmission link interconnecting said portion of the signal transfer point to it associated service switching point.

15. A method of managing the common channel signaling system, in accordance with claim 12, further comprising:

providing database service to said signal transfer point by providing a service control point; and interconnecting said service control point to one of said portions of said signal transfer point with a digital transmission link.

16. A method of managing the common channel signaling system, in accordance with claim 15, further comprising collocating said database service with one of said portions of said signal transfer point.

17. A method of managing the common channel signaling system, in accordance with claim 15, further comprising:

providing database service to said signal transfer point by providing a second service control point; and interconnecting said second service control point to a different one of said portions of said signal transfer point with a digital transmission link.

18. The method of claim 12, further comprising locating a facility at one of said coustituent parts for communication, administration, and control of all of the portions of the signal transfer point.

* * * * *